(No Model.)

H. COOK.
POTATO DIGGER.

No. 536,850. Patented Apr. 2, 1895.

WITNESSES:
Robert Sollberger
Louisa Browne

INVENTOR
Hiram Cook,
BY Drake & Co. ATTY'S.

UNITED STATES PATENT OFFICE.

HIRAM COOK, OF VERONA, NEW JERSEY.

POTATO-DIGGER.

SPECIFICATION forming part of Letters Patent No. 536,850, dated April 2, 1895.

Application filed April 19, 1894. Serial No. 508,088. (No model.)

*To all whom it may concern:*

Be it known that I, HIRAM COOK, a citizen of the United States, residing at Verona, in the county of Essex and State of New Jersey, have invented certain new and useful Improvements in Potato-Diggers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to reduce the cost of construction, to increase the efficiency of the machine, to avoid the use of gears such as would be apt to catch weeds when in service and be clogged thereby and to secure other advantages and results some of which will be referred to hereinafter in connection with the description of the working parts.

The invention consists in the improved potato digger and in the arrangements and combinations of parts, all substantially as will be hereinafter set forth and finally embraced in the clauses of the claim.

Figure 1:
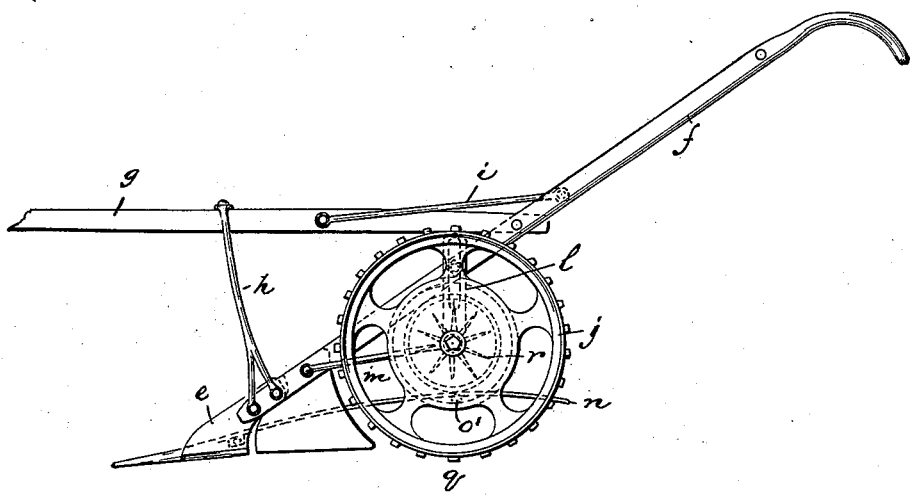
Figure 2:
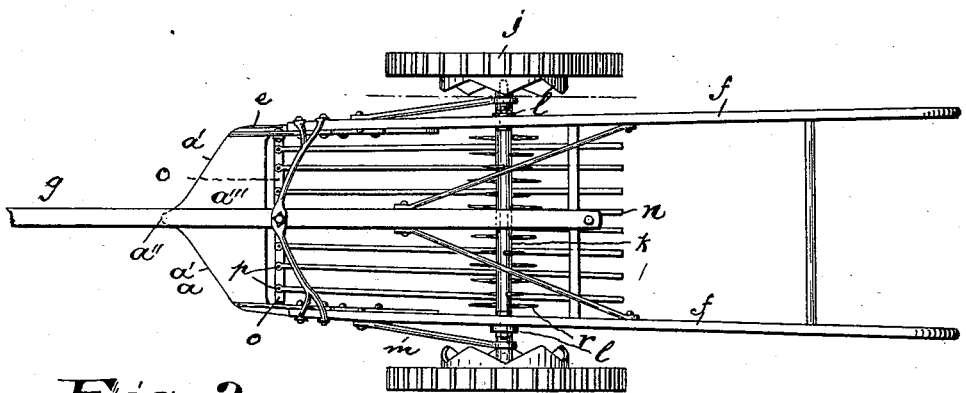
Figure 3:
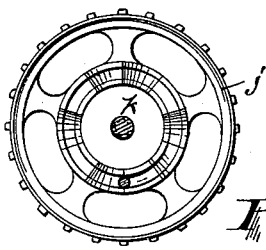

Referring to the accompanying drawings, in which like letters of reference indicate corresponding parts in each of the figures, Figure 1 is a side elevation. Fig. 2 is a plan of the improved digger. Fig. 3 is a side elevation of one of the wheels of the same.

In said drawings, $a$, indicates the shovel which, at its forward edge, $a'$, is oppositely inclined from a central projecting tooth, $a''$, adapted to enter the ground with ease, the oppositely inclined edges being adapted to throw stones, should any engage the same, laterally away from the shovel. The shovel is flat at the bottom $a'''$, with the exception of one, or more, very low projecting ribs, $b$, which tends to break the clod before it passes upon the separator $c$, the flat bottom serving to take up the dirt in shallow clods and feed it evenly upon the said separator.

At the sides of the flat bottom are arranged vertical plates, $e$, which are formed integral with said bottom, and at their forward edges are provided with sharpened edges, adapted to cut the clod as it passes through the same and at the upper parts said plates are upwardly and backwardly curved as shown more clearly in Fig. 1, and provide for the handles. Said handles $f$, $f$, are approximately parallel one with the other, and are curved at their upper extremities so as to provide convenient means to receive the hands for guiding the device as it is drawn by the horse or horses. To the said handles is secured at a proper distance above the ground, a draft bar $g$, which is held to said handles by suitable braces, $h$ and $i$. To hold the shovel in proper relation to the ground and to relieve the hand from the strain of shoveling, I have provided wheels, $j, j$, arranged on an axle, $k$, which is carried by journal irons, $l$, adjustably secured to the handles, $f, f$. These are slotted as indicated in outline, and are carried by bolts passing through the slots and into the handles. Their lower ends may be braced by rods, $m$. Back of the bottom of the shovel is arranged a series of longitudinal rods or bars, $n$, forming the separator $c$. These are connected at their forward ends, by a cross bar, $o$, and are arranged substantially in line with the flat bottom of the shovel so as to receive the dirt therefrom. They are preferably given a slight inclination and curve, as shown in side elevation in Fig. 1.

The forward connecting bar $o$, of the longitudinal bars is pivotally connected with the side plates, $e$, $e$, so as to allow a limited vertical movement of said longitudinal bars, and the said longitudinal bars have preferably a pivotal relation to said connecting bar, as indicated at $p$, so that the said longitudinal bars will be allowed both a vertical and horizontal vibration. Near the rear ends of said longitudinal separator bars, $n$, is a transverse bar $o'$, which connects said bars and extends laterally into engagement with cams formed on the inner sides of the wheels, $j$. Said cams are of annular form, and provided with a slot adapted to hold the ends of said transverse rod, and are provided with a series of oppositely inclined teeth or cam projections, which serve to give the transverse bar and the separating rods or bars connected therewith a rapid vibration horizontally.

Above the separator, the axle of the digger is provided with teeth, $r$, for drawing the weeds through, and preventing the same from clogging the forward part of the machine.

The axle, turning with the wheels, serves to give a proper rotary movement to the teeth.

By the constructions described, the dirt, after having been lifted by the shovels, is caused to travel over an unobstructed course, and thus there is no resistance tending to impede the progress of the digger, and furthermore, all cog-gearing, by means of which power is transmitted from one working part to another, is dispensed with.

While I have shown but one modification of the invention, I am aware that others may be employed, and I do not wish to be understood as limiting myself, excepting as the state of the art may require.

Having thus described my invention, what I claim as new is—

1. The improved potato digger herein described, in which is combined with the shovel having upwardly extending side plates to which handles are secured and in which a connecting bar, o, is arranged, wheels attached to said handles and having cam wheels, a rear connecting bar, o', extending into engagement with said cam wheels, and separating bars pivotally connected to said bars, o, and o', substantially as and for the purposes set forth.

2. The combination with the wheels and handled shovel having upturned sides, a connecting bar arranged in said sides at the back edge of the shovel bottom, longitudinal bars pivoted on said connecting bar, a rear connecting bar extending laterally into engagement with cams, held by said cams from falling and given thereby lateral reciprocations, and said cams having slots for holding said bar and a series of oppositely inclined teeth or cam projections, substantially as set forth.

In testimony that I claim the foregoing I have hereunto set my hand this 12th day of April, 1894.

HIRAM COOK.

Witnesses:
CHARLES H. PELL,
LOUISA BROWNE.